(12) United States Patent
Wu

(10) Patent No.: US 10,714,003 B1
(45) Date of Patent: Jul. 14, 2020

(54) IMAGE PROCESSING METHOD AND IMAGE PROCESSING SYSTEM

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/239,477

(22) Filed: Jan. 3, 2019

(51) Int. Cl.
*G09G 3/3225* (2016.01)
*G06T 5/00* (2006.01)
*G06T 5/40* (2006.01)
*H01L 27/32* (2006.01)

(52) U.S. Cl.
CPC ........... *G09G 3/3225* (2013.01); *G06T 5/009* (2013.01); *G06T 5/40* (2013.01); *H01L 27/3244* (2013.01); *G09G 2310/027* (2013.01); *G09G 2310/0275* (2013.01); *G09G 2320/103* (2013.01)

(58) Field of Classification Search
CPC .. G09G 3/3233; G09G 3/3225; G09G 3/3648; G09G 3/32; G09G 2320/0626; G09G 2320/0646; G09G 2320/0276; G09G 2320/062; G09G 2320/0633; G09G 2360/16; G09G 2330/021; G09G 2310/027; G09G 2340/16; G09G 2340/06; G09G 2340/0435; G06T 5/009; G06T 5/40; G06T 3/40; G06T 7/90; H04N 9/045; H04N 9/735
See application file for complete search history.

(56) References Cited

U.S. PATENT DOCUMENTS

2007/0165947 A1 7/2007 Paik
2009/0060360 A1* 3/2009 Huang ............... G06T 5/009
382/237
2014/0300618 A1* 10/2014 Wyatt ............... G06T 5/009
345/589

FOREIGN PATENT DOCUMENTS

CN 105895036 A 8/2016
TW 201320049 A1 5/2013

* cited by examiner

*Primary Examiner* — Xuemei Zheng
(74) *Attorney, Agent, or Firm* — Winston Hsu

(57) ABSTRACT

An image processing system comprising: a gray level analyzing circuit, configured to analyze a gray level distribution of an input image and to calculate quantities for pixels having different gray levels in the input image; and a processor, coupled to the gray level analyzing circuit, configured to set first pixel gains for the pixels according to the gray levels and the quantities, and to process the input image with the first pixel gains to generate an output image.

10 Claims, 4 Drawing Sheets

| | | | | | Quantity | | | | | Tb_1 |
|---|---|---|---|---|---|---|---|---|---|---|
| | | 0 | 512 | 1024 | 1536 | 2048 | 2560 | 3072 | 3854 | 4096 |
| Gray level | 0 | 1 | 1 | 1 | 1 | 1 | 1 | 1 | 0.95 | 0.8 |
| | 32 | 1 | 1 | 1 | 1 | 1 | 1 | 1 | 0.95 | 0.8 |
| | 64 | 1 | 1 | 1 | 1 | 1 | 1 | 1 | 0.95 | 0.8 |
| | 96 | 1 | 1 | 1 | 1 | 1 | 1 | 1 | 0.9 | 0.8 |
| | 128 | 1 | 1 | 1 | 1 | 1 | 1 | 1 | 0.9 | 0.8 |
| | 160 | 1 | 1 | 1 | 1 | 1 | 1 | 1 | 0.85 | 0.8 |
| | 192 | 1 | 1 | 1 | 1 | 1 | 1 | 1 | 0.85 | 0.8 |
| | 224 | 1 | 1 | 1 | 1 | 1 | 1 | 1 | 0.8 | 0.8 |
| | 255 | 1 | 0.8 | 0.8 | 0.8 | 0.8 | 0.8 | 0.8 | 0.8 | 0.8 |

Quantity

| | 0 | 512 | 1024 | 1536 | 2048 | 2560 | 3072 | 3854 | 4096 |
|---|---|---|---|---|---|---|---|---|---|
| 0 | 1 | 1 | 1 | 1 | 1 | 1 | 1 | 0.95 | 0.8 |
| BR1 | 1 | 1 | 1 | 1 | 1 | 1 | 1 | 0.95 | 0.8 |
| BR2 | 1 | 1 | 1 | 1 | 1 | 1 | 1 | 0.95 | 0.8 |
| BR3 | 1 | 1 | 1 | 1 | 1 | 1 | 1 | 0.9 | 0.8 |
| BR4 | 1 | 1 | 1 | 1 | 1 | 1 | 1 | 0.9 | 0.8 |
| BR5 | 1 | 1 | 1 | 1 | 1 | 1 | 1 | 0.85 | 0.8 |
| BR6 | 1 | 1 | 1 | 1 | 1 | 1 | 1 | 0.85 | 0.8 |
| BR7 | 1 | 1 | 1 | 1 | 1 | 1 | 1 | 0.8 | 0.8 |
| BR8 | 1 | 0.8 | 0.8 | 0.8 | 0.8 | 0.8 | 0.8 | 0.8 | 0.8 |

Brightness value (row labels); Tb_3

IMAGE PROCESSING METHOD AND IMAGE PROCESSING SYSTEM

BACKGROUND OF THE INVENTION

1. Field of the Invention

The present invention relates to an image processing method and an image processing system, and particularly relates to an image processing method and an image processing system which can reduce display power.

2. Description of the Prior Art

Due to material characteristics, an OLED (Organic Light Emitting Diode) may have a low lighting efficiency for some colors. That is, the power consumption of the OLED display is higher while displaying an image with more components of the specific color.

For example, if the OLED display has a low lighting efficiency for the blue color, the power consumption of the OLED display is higher while displaying an image with more blue components.

Therefore, a method for reducing the power consumption of the OLED display without reducing user experience is needed.

SUMMARY OF THE INVENTION

Therefore, one objective of the present invention is to provide an image processing method which can reduce power consumption of an OLED display.

Another objective of the present invention is to provide an image processing system which can reduce power consumption of an OLED display.

One embodiment of the present invention discloses an image processing system, comprising: a gray level analyzing circuit, configured to analyze a gray level distribution of an input image and to calculate quantities for pixels having different gray levels in the input image; and a processor, coupled to the gray level analyzing circuit, configured to set first pixel gains for the pixels according to the gray levels and the quantities, and to process the input image with the first pixel gains to generate an output image.

Another embodiment of the present invention discloses an image processing system comprising: a color model generating circuit, configured to generate a color model of an input image; and a processor, configured to acquire hue parameters of the input image based on the color model, and applies the processor to set second pixel gains for the pixels according to the quantities and the hue parameters.

In view of above-mentioned embodiments, since the pixel gains of the image portion requiring more display power is adjusted to be smaller, the power consumption of the OLED display can be greatly reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Also, the components can be integrated to fewer components or be separated to more components. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
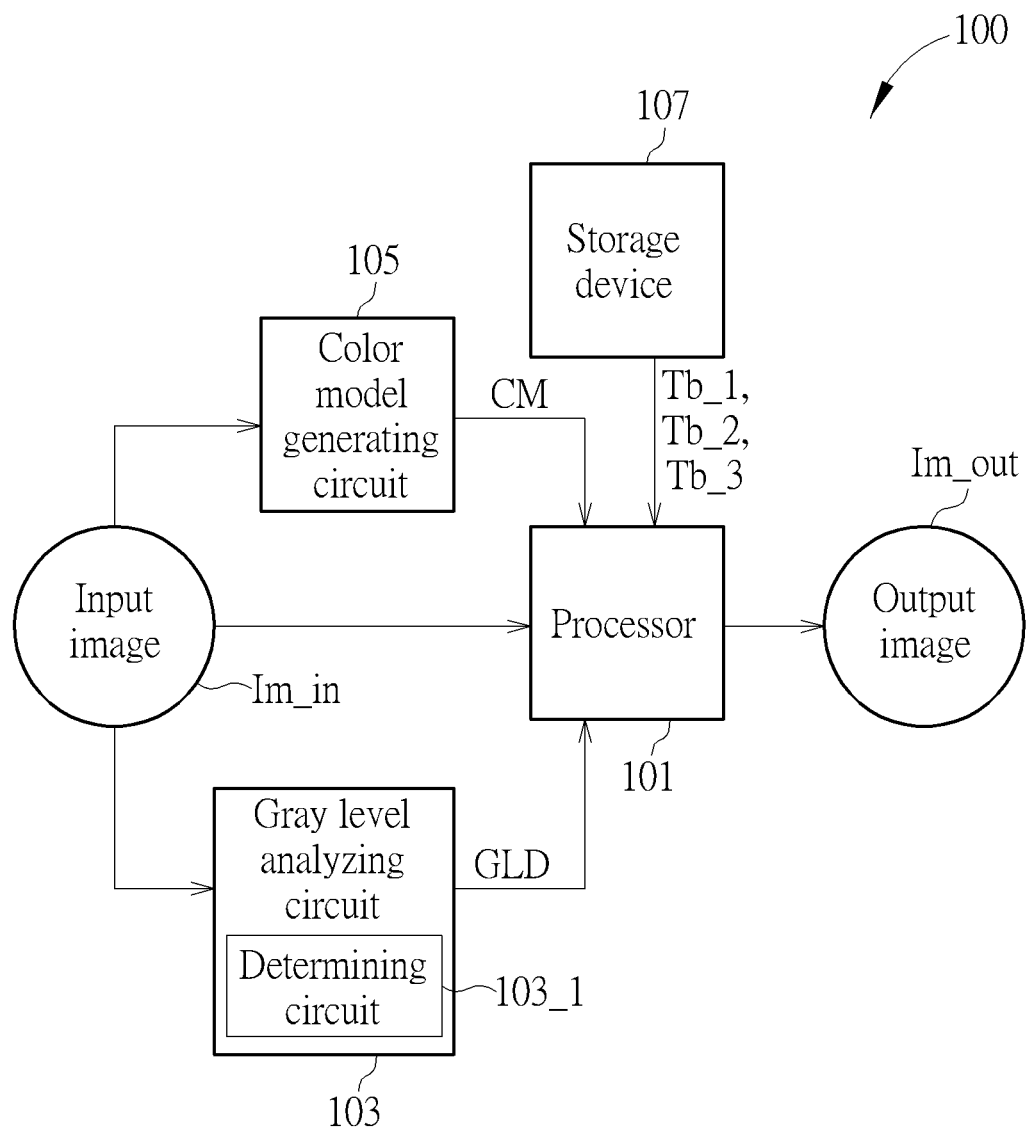
FIG. 1 is a block diagram illustrating an image processing system according to one embodiment of the present invention.

FIG. 1 is a block diagram illustrating an image processing system according to one embodiment of the present invention. As illustrated in FIG. 1, the image processing system 100 comprises a processor 101, a gray level analyzing circuit 103, a color model generating circuit 105 and a storage device 107. The gray level analyzing circuit 103 or the color model generating circuit 105 can be integrated to the processor 101. Besides, the image processing system 100 can comprise only one of the gray level analyzing circuit 103 and the color model generating circuit 105.

Figure 2:
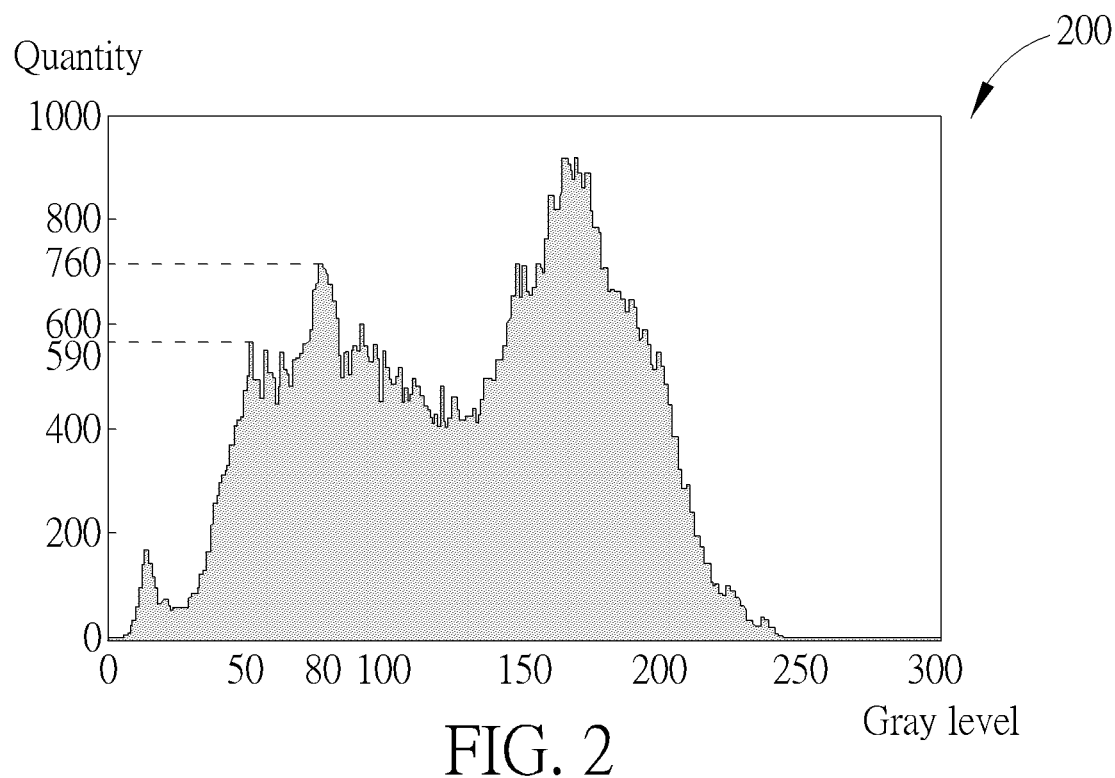
FIG. 2 is a schematic diagram illustrating an example for a gray level diagram.

The gray level analyzing circuit 103 is configured to provide a gray level distribution GLD of an input image Im_in. In one embodiment, the gray level distribution GLD is a gray level diagram. Please refer to FIG. 2, which illustrates an example for a gray level diagram. In FIG. 2, the gray level diagram 200 illustrates the quantity of the pixels with different gray levels. For example, the quantity for the pixels with a gray level 50 is 590 and the quantity for the pixels with a gray level 80 is 760. In other words, the gray level analyzing circuit 103 calculates quantities for pixels having different gray levels in the input image Im_in.

After that, the processor 101 sets first pixel gains for the pixels in the input image Im_in according to the quantities and the gray levels. In one embodiment, the processor 101 reads a pixel gain table Tb_1 from a storage device 107, and then sets first pixel gains for the pixels in the input image Im_in according to the quantities and the gray levels based on the pixel gain table Tb_1. The storage device 107 is not limited to be independent form the processor 101 and locate in the image processing system 100. For example, the storage device 107 can be integrated to the processor 101 or be an online hard drive. After that, the processor 101 processes the input image Im_in with the first pixel gains to generate an output image Im_out.

In one embodiment, the processor 101 only applies the first pixel gains to adjust pixel values of the input image Im_in to generate an output image Im_out. In another embodiment, the processor 101 applies the first pixel gains and other pixel values to adjust pixel values of the input image Im_in, which will be described later.

Figure 3:
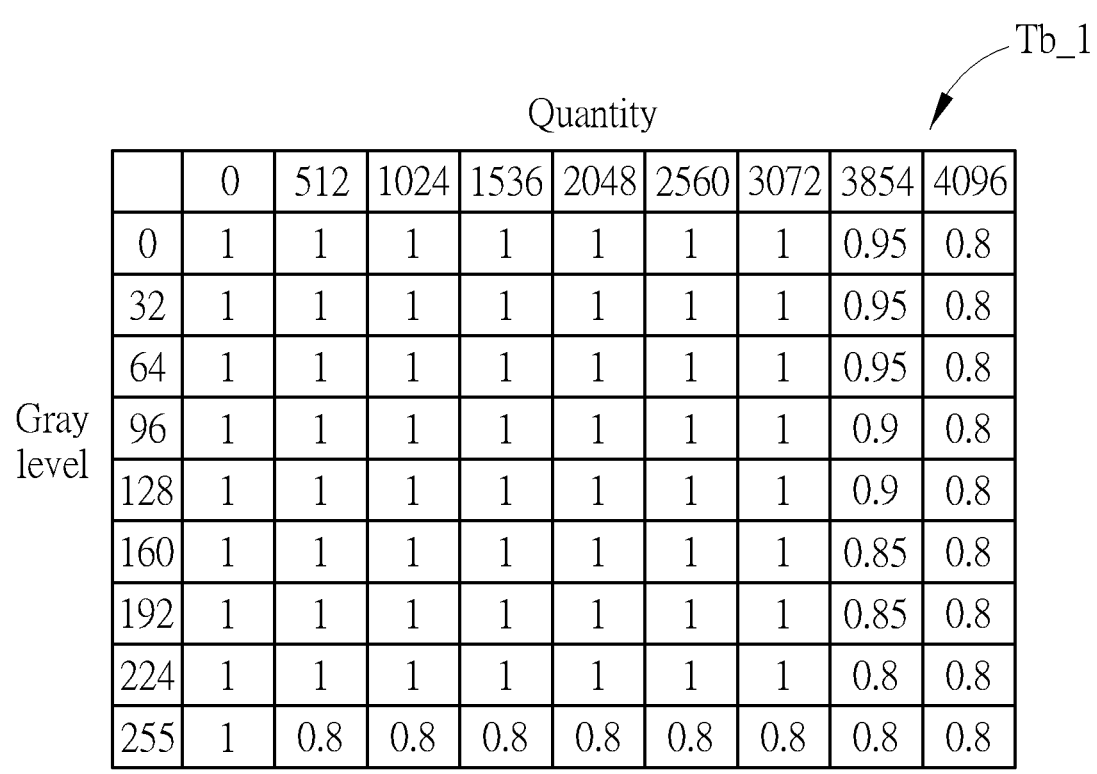
FIG. 3 is a schematic diagram illustrating a pixel gain table comprising first pixels gains related to gray level and quantities.

FIG. 3 is a schematic diagram illustrating a pixel gain table Tb_1 comprising first pixels gains related to gray levels and quantities. As illustrated in FIG. 3, the horizontal axis of the pixel gain table Tb_1 means quantity and the vertical axis of the pixel gain table Tb_1 means gray level. Also, the values 0.8-1 in the pixel gain table Tb_1 means the first pixel gains. For example, if the quantity for pixels with a gray level 160 is 3854, the pixel gain for the pixels with a gray level 160 is 0.85. For another example, if the quantity for pixels with a gray level 128 is 4096, the pixel gain for the pixels with a gray level 128 is 0.8.

In the embodiment of FIG. 3, at least part of the first pixel gains is inversely proportional to the quantity. That is, the larger the quantity is, the smaller the first gain pixel is. For example, if the quantity for pixels with a gray level 64 is 4096, the first pixel gain is 0.8, and if the quantity for pixels with a gray level 64 is 3854, the first pixel gain is 0.95. Further, in the embodiment of FIG. 3, at least part of the first pixel gains is inversely proportional to the gray level. That is, the larger the gray level is, the smaller the first gain pixel is. For example, if the gray level for pixels with a quantity 3854 is 128, the first pixel gain is 0.9, and if the gray level for pixels with a quantity 3854 is 224, the first pixel gain is 0.8.

The above-mentioned two methods for deciding first pixels values have some advantages. Each pixel may have sub-pixels comprising an R-pixel, a G pixel and a B pixel, and a gray level thereof can be calculated based on pixel values of the R-pixel, the G pixel and the B pixel. Therefore, if the gray level is larger, it means the pixel values of R pixels, G pixels or B pixels may be larger. As above-mentioned, the OLED display may have a low lighting efficiency for at least one color. Accordingly, if the gray level is large, it means the OLED display needs more power to display the input image Im_in. Accordingly, at least part of the first pixel gains is inversely proportional to the gray level.

In one embodiment, the processor 103 only generates gray level distribution GLD for an image having similar brightness values such as a white image, a black image or a gray image. Therefore, in one embodiment the processor 103 has a determining circuit 103_1, which calculates a difference between a maximum pixel value and a minimum pixel value of the input image Img_in. The processor 103 generates the gray level distribution GLD if the difference is below a threshold value, which means the input image Im_in has similar brightness values. On the opposite, if the difference is above the threshold value, it means the input image Im_in does not have similar brightness values such that the processor 103 does not generate the gray level distribution GLD. It will be appreciated the method for determining whether the image has similar brightness values or not is not limited to the above-mentioned example.

Besides, if the quantity of the pixels with a specific gray level is larger, it means the pixels with the specific gray level occupies a large part of the input image Im_in, thus may greatly increase the display power if the specific gray level is large. On the opposite, if the quantity of the pixels with a specific gray level is small, it means the pixels with the specific gray level only occupies a tiny part of the input image Im_in, thus does not affect the display power too much if the specific gray level is large. Therefore, at least part of the first pixel gains is inversely proportional to the quantity. If the gray level is not contained in the pixel gain table Tb_1, the pixel gains of such gray level can be calculated based on pixel gains of similar gray level in the pixel gain table Tb_1. For example, the pixel gains of a gray level 100 can be calculated based on pixel gains of gray levels 96 and 128 in the pixel gain table Tb_1 via interpolation.

Please note, the first pixel values are not limited to be acquired by such methods and are not limited to the examples illustrated in FIG. 3.

Please refer to FIG. 1 again. The color model generating circuit 105 is configured to generate a color model CM, which comprises hue parameters and brightness parameters. The processor 101 sets second pixel gains for the pixels of the input image Im_in according to hue parameters and quantities. Also, the processor 101 sets third pixel gains for the pixels of the input image Im_in according to brightness parameters and quantities.

In one embodiment, the processor 101 reads a pixel gain table Tb_2 from the storage device 107, and accordingly sets second pixel gains for the pixels having different hue parameters. Also, in one embodiment, the processor 101 reads a pixel gain table Tb_3 from the storage device 107, and accordingly sets third pixel gains for the pixels having different brightness parameters.

Figure 4:
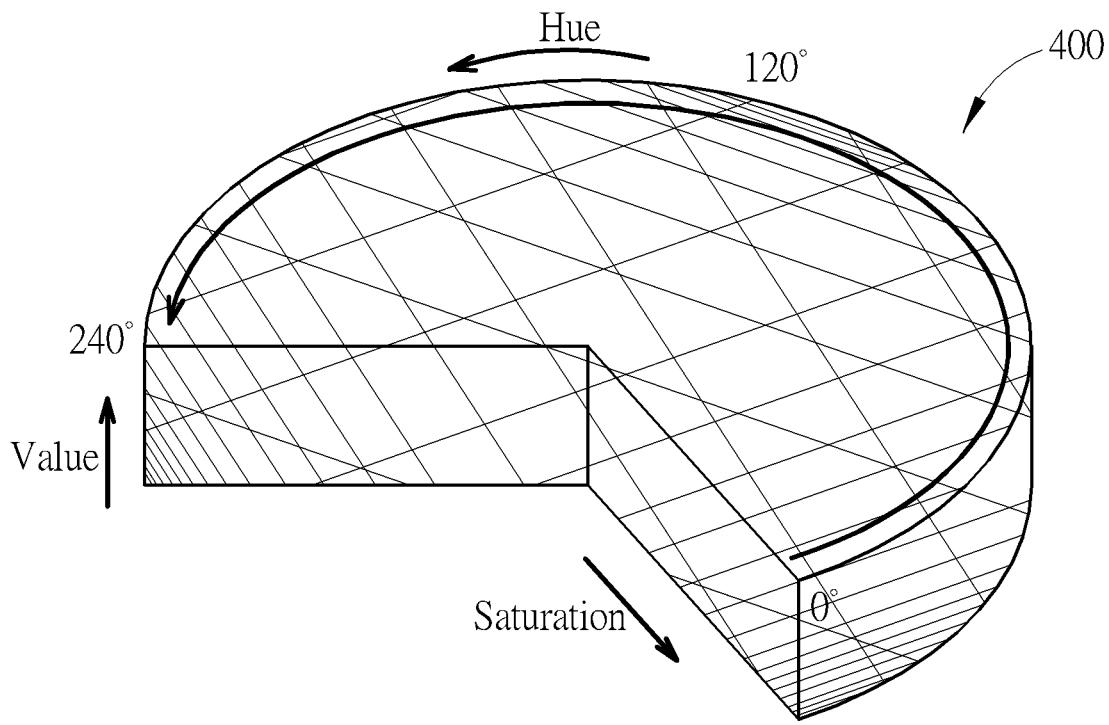
FIG. 4 is a schematic diagram illustrating an example for a color model.

FIG. 4 is a schematic diagram illustrating an example for a color model CM. In the embodiment of FIG. 4, the color model 400 is a HSV color model which comprises hue, saturation and value (brightness). Accordingly, the processor 101 can acquire hue parameters and brightness parameters from the color model CM. Please note the color model CM is not limited to a HSV color model. For example, the color model CM can be a HSL color model.

Figure 5:
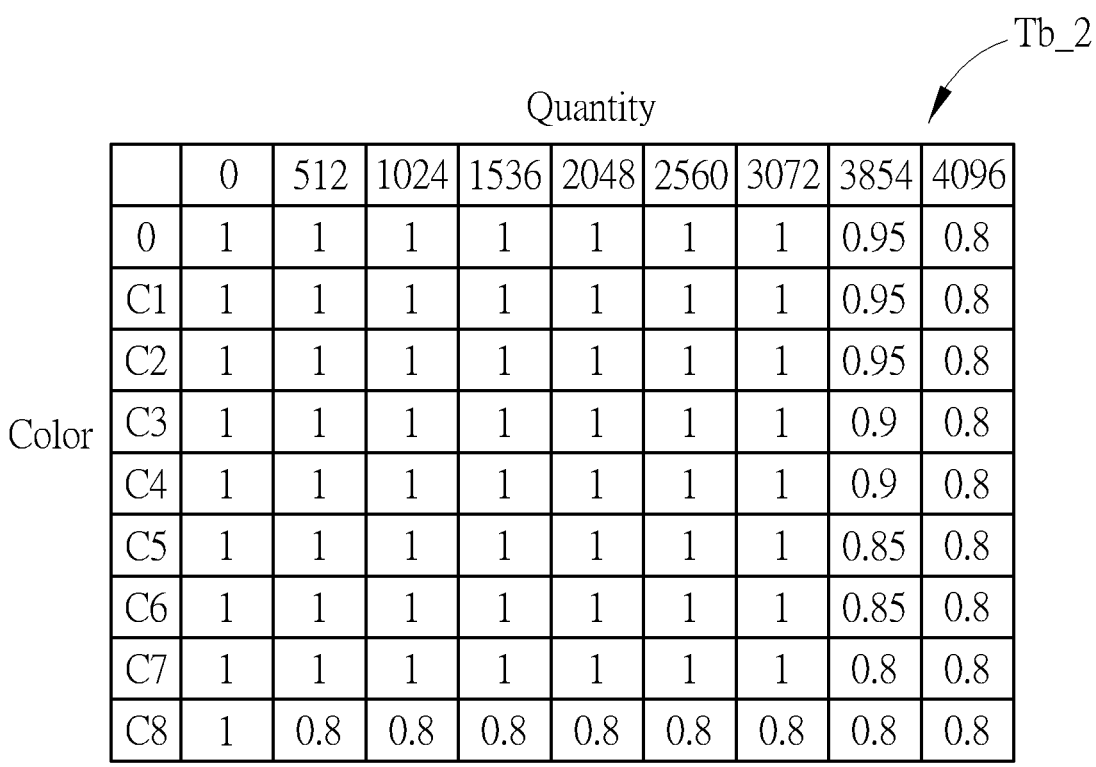
FIG. 5 is a schematic diagram illustrating a pixel gain table comprising second pixels gains related to hue parameters and quantities.

FIG. 5 is a schematic diagram illustrating a pixel gain table Tb_2 comprising second pixels gains related to hue parameters and quantities. As illustrated in FIG. 5, the horizontal axis of the pixel gain table Tb_2 means quantity and the vertical axis of the pixel gain table Tb_2 means color. Also, the values 0.8-1 in the pixel gain table Tb_2 means the second pixel gains. For example, if the quantity for pixels with a color C5 is 3854, the pixel gain for the pixels with the color C5 is 0.85. For another example, if the quantity for pixels with a color C5 is 4096, the pixel gain for the pixels with a color C4 is 0.8. The colors in FIG. 4 can be rendered in various ways, depending on the kind of the color model. If the color model CM is a HSV color model, the color can be rendered in a way of angles, for example, the color C1=0° and the color C4=180°.

In the pixel gain table Tb_2, at least part of the second pixel gains is inversely proportional to the quantity. For example, if the quantity for pixels with a color C2 is 4096, the second pixel gain is 0.8, and if the quantity for pixels with a color C2 is 3854, the first pixel gain is 0.95.

Please note the second pixel gains are not limited to the example illustrated in FIG. 5. In one embodiment, the pixel values are depending on a lighting efficiency of the colors. For example, if the OLED display has a low lighting efficiency for the color C5, the pixel gain values of color C5 is set to be smallest. Also, if the color is similar with the color C5, such as the colors C4 and C6, the pixel gains thereof are set to be smaller. On the opposite, if the color is far away from the color C5, such as the colors C1 and C8, the pixel gains thereof are set to be larger.

Figures 6, 7:
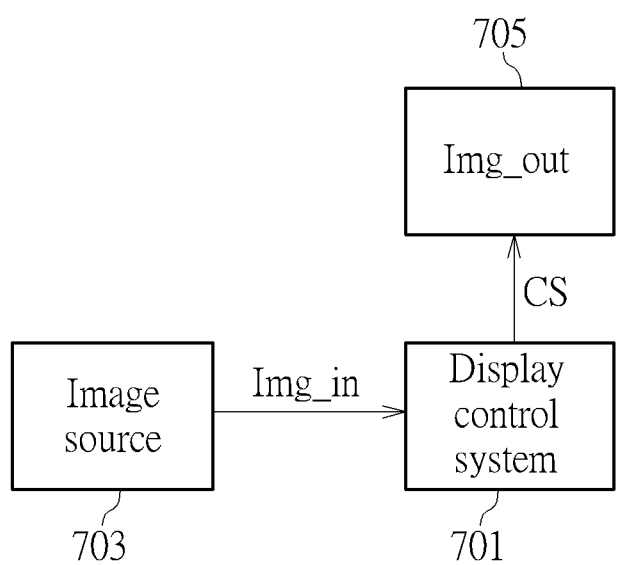
FIG. 6 is a schematic diagram illustrating a pixel gain table comprising third pixels gains related to brightness parameters and quantities.
FIG. 7 is a block diagram illustrating a display control circuit comprising the image processing system provided by the present invention.

FIG. 6 is a schematic diagram illustrating a pixel gain table Tb_3 comprising third pixels gains related to brightness parameters and quantities. As illustrated in FIG. 6, the horizontal axis of the pixel gain table Tb_3 means quantity and the vertical axis of the pixel gain table Tb_3 means brightness values. Also, the values 0.8-1 in the pixel gain table Tb_3 means the third pixel gains. For example, if the quantity for pixels with a brightness value BR5 is 3854, the pixel gain for the pixels with the color C5 is 0.85. For another example, if the quantity for pixels with a brightness value BR5 is 4096, the pixel gain for the pixels with a brightness value BR5 is 0.8. It will be appreciated the brightness may be replaced with another name has a similar meaning if the color model CM is not a HSV color model. For example, if the color model CM is a HSL color model, the brightness is replace by "luminance".

In the pixel gain table Tb_3, at least part of the third pixel gains is inversely proportional to the quantity. For example, if the quantity for pixels with a brightness value BR2 is 4096, the third pixel gain is 0.8, and if the quantity for pixels with a brightness value BR2 is 3854, the first pixel gain is 0.95. Also, at least part of the third pixel gains is inversely proportional to the brightness value. For example, if the brightness value for pixels with a quantity 3854 is BR4, the third pixel gain is 0.9, and if the brightness value for pixels with a quantity 3854 is BR7, the third pixel gain is 0.8.

Besides the above-mentioned setting rules for the pixel gains, the pixel gains can be decided to meet any requirements. For example, the pixel gains can be set to reduce the power consumption of the OLED display but does not affect user experience. Also, the image processing system 100 can apply only the first pixel gains, only the second pixel gains or only the third pixel gains to generate the output image Im_out. Alternatively, the image processing system 100 can apply at least one of the first pixel gains, the second pixel gains and the third pixel gains to generate the output image Im_out . For example, the image processing system 100 can apply the first pixel gains and the second pixel gains to generate the output image Im_out.

FIG. 7 is a block diagram illustrating a display control circuit comprising the image processing system 100 provided by the present invention. Please note the image processing system 100 illustrated in FIG. 1 is not limited to be allied to the display control system 701, the image processing system 100 can be applied to any electronic apparatus.

As above-mentioned, the processor 101 can apply the first pixel gains and other pixel values to adjust pixel values of the input image Im_in. In one embodiment, the processor 101 multiplies the first pixel gain with the second pixel gain or the third pixel gain to acquire a further pixel gain, and process the input image Im_in to generate the output image Im_out.

As illustrated in FIG. 7, the display control system 701 comprises the image processing system 100 and applies the above-mentioned image processing methods to process the input image Img_in to generate an output image Img_out. The input image Img_in is from an image source 703, which can be, for example, a TV card or a storage device. After the input image Img_in is processed, the display control system 701 controls the display 705 to display the output image Img_out.

In one embodiment the display 705 is an OLED display, and spends less power to display the output image Img_out then to display the input image Img_in. Besides, in one embodiment the display control system 701 is a timing control circuit which controls the timing for the devices in the display. Therefore, the above-mentioned image processing method can be regarded as an image display method if the output image Im_out is displayed.

In view of above-mentioned embodiments, since the pixel gains of the image portion requiring more display power is adjusted to be smaller, the power consumption of the OLED display can be greatly reduced. However, please note the present invention is not limited to solve such problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system, comprising:
  a gray level analyzing circuit, configured to analyze a gray level distribution of all pixels of an input image and to calculate quantities for the pixels having different gray levels in the input image; and
  a processor, coupled to the gray level analyzing circuit, configured to set first pixel gains for the pixels according to the gray levels and the quantities, and to process the input image with the first pixel gains to generate an output image;
  wherein the first pixel gains are inversely proportional to the quantities and the gray levels;
  wherein the first pixel gains of at least two different ones of the pixels are different.

2. The image processing system of claim 1, wherein the gray level analyzing circuit further comprises a determining circuit configured to determine whether the input image has similar brightness values or not, wherein the gray level analyzing circuit calculates quantities for the pixels having different gray levels when the input image has the similar brightness values and does not calculate the quantities when the input image does not have the similar brightness values;
  wherein the determining circuit calculates a difference between a maximum pixel value and a minimum pixel value of the input image, and determines that the input image has similar brightness values if the difference is below a threshold value.

3. The image processing system of claim 1, further comprising:
  a color model generating circuit, configured to generate a color model of the input image;
  wherein the processor acquires hue parameters of the input image based on the color model, sets second pixel gains for the pixels according to quantities of pixels with different ones of the hue parameters among the pixels and the hue parameters, and further processes the input image with the second pixel gains to generate the output image.

4. The image processing system of claim 3, wherein the processor acquires brightness parameters of the input image based on the color model, sets third pixel gains for the pixels according to quantities of pixels with different ones of the brightness parameters among the pixels and the brightness parameters, and further processes the input image with the third pixel gains to generate the output image.

5. The image processing system of claim 4, wherein the processor multiplies the first pixel gain with the second pixel gain or the third gain to generate a fourth pixel gain, and processes the input image with the fourth pixel gain to generate the output image.

6. The image processing system of claim 4, wherein at least part of the third pixel gains is inversely proportional to the brightness parameters.

7. An image processing system, comprising:
a color model generating circuit, configured to generate a color model of an input image; and
a processor, configured to acquire hue parameters of the input image based on the color model, and is configured to set second pixel gains for pixels according to quantities of pixels with different ones of the hue parameters among the pixels and the hue parameters;
wherein the second pixel gains are inversely proportional to the quantities;
wherein the second pixel gains are proportional to lighting efficiencies of colors of the pixels.

8. The image processing system of claim 7, wherein the processor acquires brightness parameters of the input image based on the color model, sets third pixel gains for the pixels according to the quantities and the brightness parameters, and processes the input image with the second pixel gains and the third pixel gains to generate the output image.

9. The image processing system of claim 8, wherein the processor multiplies the second pixel gain with the third gain to generate a fourth pixel gain, and processes the input image with the fourth pixel gain to generate the output image.

10. The image processing system of claim 7, wherein at least part of the third pixel gains is inversely proportional to the brightness parameters.

* * * * *